June 7, 1966   M. KIMPFLINGER ETAL   3,254,744
FREEWHEEL HUB WITH BACK-PEDALING BRAKE
Filed Sept. 25, 1963

INVENTORS
Max Kimpflinger
Hans Joachim Schwerd-
höfer
By Richard Low
Ag't

June 7, 1966  M. KIMPFLINGER ETAL  3,254,744
FREEWHEEL HUB WITH BACK-PEDALING BRAKE
Filed Sept. 25, 1963  2 Sheets-Sheet 2

INVENTORS
Max Kimpflinger
Hans Joachim Schwerdhöfer
By Richard Ernst
Agt

United States Patent Office 3,254,744
Patented June 7, 1966

3,254,744
FREEWHEEL HUB WITH BACK-PEDALING BRAKE
Max Kimpflinger and Hans Joachim Schwerdhöfer, Schweinfurt, Germany, assignors to Fichtel & Sachs A.G., Schweinfurt am Main, Germany, a corporation of Germany
Filed Sept. 25, 1963, Ser. No. 311,560
Claims priority, application Germany, Sept. 26, 1962, F 37,886
10 Claims. (Cl. 192—6)

This invention relates to a freewheeling hub with a back-pedaling brake for bicycles.

A known freewheeling hub with back-pedaling brake comprises a hub axle, bearing rings on said hub axle, a driver mounted on one of said bearing rings, a hub sleeve mounted with one end on said driver and with its other end on one of said bearing rings, one-way driving means connecting said driver and said hub sleeve, and a brake unit; the brake unit is made up of one of said bearing rings which takes up the brake reaction torque, a brake actuating member and a brake shell expandable by co-operation of said bearing ring and said brake actuating member so as to be pressed into frictional engagement with a braking face of said hub sleeve.

In known freewheeling hubs the brake shell is a part separate from the other parts of the brake unit.

In accordance with this invention the brake shell is made integrally with one of said other parts of the brake unit, i.e. either with the bearing ring associated with the brake unit or with the brake actuating member.

Preferably, the brake shell has elastic blades extending from the associated part of the brake unit.

Optionally, the elastic blades are separated near their roots by enlarged rounded apertures which taper towards the free ends of the blades. In order to increase the axial length of the contact area between the elastic blades, when expanded, and the braking face of the hub sleeve the outer faces of the elastic blades define an envelope of slightly conical or convex shape.

Figure 1:
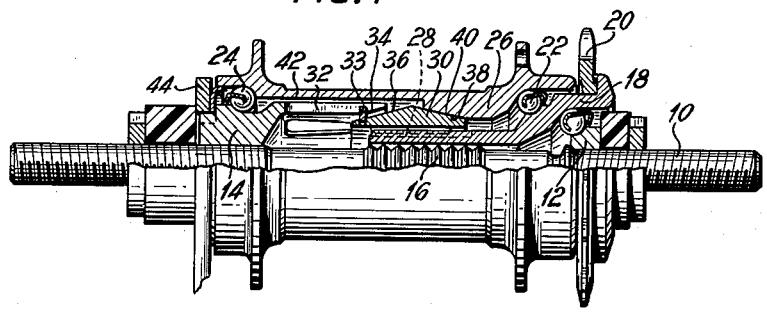
FIG. 1 is an elevational, partly axially sectional view of a first embodiment of the invention.

In FIG. 1 there is shown a hub axle 10. On this axle 10 there are mounted a bearing ring 12 and a bearing ring 14. On bearing ring 12 and a corrugated section 16 of the hub axle 10 a driver 18 is rotatably mounted. On this driver there is fixed a sprocket 20. On driver 18 and bearing ring 14 a hub sleeve 26 is mounted by ball bearings 22 and 24 respectively. On driver 18 a brake cone 30 is mounted by means of threads 28. Elastic blades 32 (see FIG. 3) integrally extend from bearing ring 14. The elastic blades define an inner conical face 34 adjacent their free ends. The brake cone 30 provides a conical outer face 36 opposite to said conical inner face 34. A further conical outer face 38 is provided on the brake cone 30. A conical inner face 40 is provided on hub sleeve 26 opposite to said conical outer face 38; a friction spring 33 is provided between elastic blades 32 and brake cone 30.

The operation of the hub so far described is as follows:

During forward pedaling, a driving torque is produced by sprocket 20 and driver 18. Rotary movement of the brake cone 30 relative to the axle 10 is impeded by friction spring 33 and the brake cone is therefore shifted on the threads 28 into its right terminal position illustrated in FIG. 1. The conical outer face 38 engages the conical inner face 40 of the hub sleeve 26 and is pressed against it. The torque is therefore transmitted by the brake cone 30 to the hub sleeve 26 when the brake cone reaches the position illustrated in FIG. 1.

During freewheeling, the driver 18 stands still and the brake cone 30 is entrained by hub sleeve 26. Due to this entrainment, the brake cone 30 threadedly moves toward the left as illustrated in FIG. 1 until the conical outer face 38 of the brake cone 30 loses engagement with the conical inner face 40 of hub sleeve 26.

During braking, the driver 18 is rotated backwards by pedaling backwardly. Rotation of the brake cone 30 is impeded by the friction spring 33, and the brake cone is therefore shifted to the left as illustrated in FIG. 1 by the threads 28. When the brake cone 30 is shifted to the left, its conical outer face 36 comes into engagement with the free ends of the elastic blades 32 which define the face 34. The elastic blades 32 are therefore deflected radially outwardly and come into frictional engagement with a friction face 42 of hub sleeve 26. The elastic blades 32 therefore exert a braking torque on hub sleeve 26. The reaction torque corresponding to the braking torque is transmitted from the elastic blades 32 to the bearing ring 14, and from this ring to a bicycle frame (not illustrated) by means of an arm 44.

Figure 3:
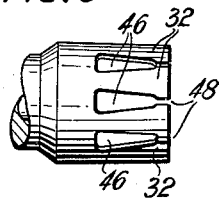
FIG. 3 illustrates a common element of the hubs shown in FIGS. 1 and 2.

In FIG. 3, the brake shell is illustrated in detail.

The elastic blades 32 are separated from each other by apertures 46. These apertures 46 are enlarged adjacent the roots of elastic blades 32 and rounded in these enlarged sections. The apertures taper towards the free ends of the elastic blades 32 to form narrow slots 48.

The brake shell according to FIG. 3 is manufactured in the following way:

A blank is made by cold-forging; the apertures 46 are punched out while leaving connections between the free ends of the elastic blades. After punching out of the apertures 46 the brake shell is hardened by heat treatment and finally slots 48 are made by breaking the connections between the free ends of the elastic blades.

Figure 4:
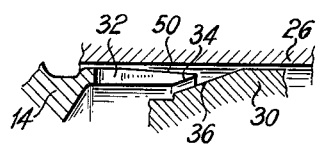
FIG. 4 is a fragmentary view of the hub of FIG. 1 with the brake released.
Figure 5:
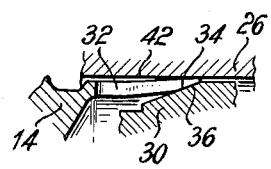
FIG. 5 shows the device of FIG. 4 with the brake engaged.

As can be seen from FIG. 4 the elastic blades 32 are conically chamfered at 50. Due to this conical chamfering, the blades 32 contact the braking face 42 over a relatively great axial length when the blades 32 are deflected.

Figure 6:
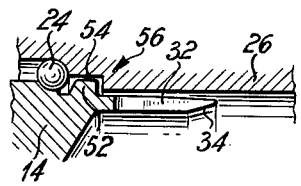
FIG. 6 shows a modification of the device of FIGURE 4.

As shown in FIG. 6 an annular rib 52 may be provided on bearing ring 14. The rib forms a labyrinth seal 56 in co-operation with an annular recess 54 of hub sleeve 26.

Figure 2:
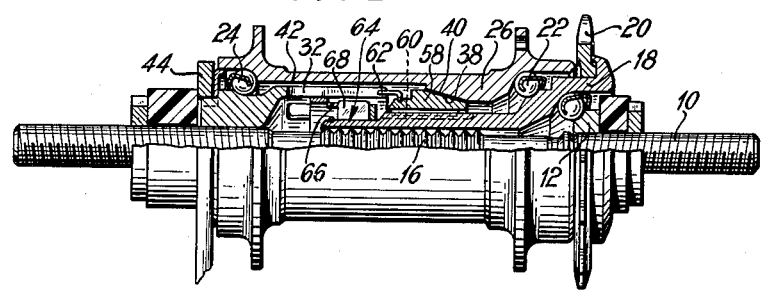
FIG. 2 is a corresponding view of a second embodiment.

In the embodiment of FIG. 2 most parts are identical with those of the embodiment of FIG. 1. These parts are provided with the same reference numerals as in FIG. 1.

In the embodiment illustrated in FIG. 2 the one-way driving connections between driver 18 and hub sleeve 26 is formed by an internally threaded member 58 which has only a driving but not a braking function. A conical outer face 38 of the member 58 co-operates with a conical inner face 40 of the sleeve 26 in the same way as described in connection with the embodiment of FIG. 1. For this purpose, the threaded member 58 is mounted on threads 60 on driver 18 and its rotation is impeded by a friction spring 62 engaging blades 32. In the embodiment as illustrated in FIG. 2 there is provided a roller clutch 64. The clutch consists of a cage 66 mounted on the driver 18, clamping rollers 68. During back pedaling, the clamping rollers 68 are wedged between driver 18 and elastic blades 32 so that the elastic blades 32 are pressed against the braking face 42 of the hub sleeve 26.

Figure 7:
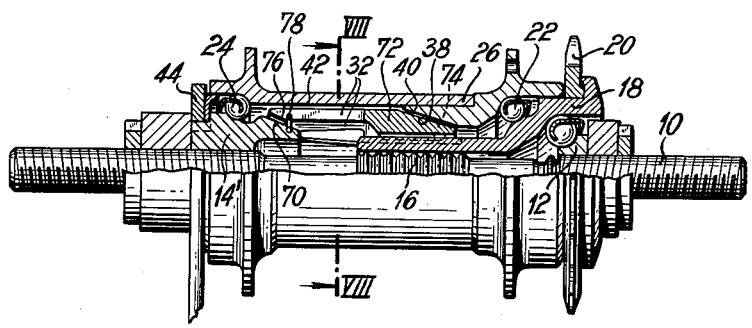
FIG. 7 illustrates a third embodiment of the invention in a view similar to that of FIG. 1.
Figure 8:
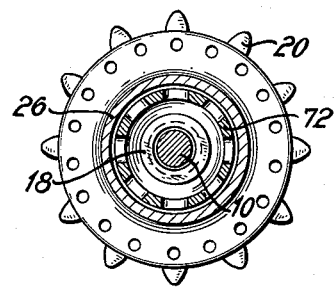
FIG. 8 is a section taken on the line VIII—VIII of FIG. 7.

The embodiment according to FIG. 7 is also partially identical with that according to FIG. 1. Similar parts are provided with the same reference numerals. In the embodiment of FIG. 7, the bearing ring 14' has a conical outer face 70. The driver 18 carries a threaded member 72 on threads 74. The member 72 bears elastic blades 32 shaped as shown in FIG. 3. At their free ends, the elastic blades 32 define a conical inner face 76 which conforms to the conical outer face 70 on bearing ring 14'. A friction spring 78 is provided between bearing ring 14' and elastic blades 32. The threaded member 72 also has a conical outer face 38 which co-operates with the conical inner face 40 of the sleeve 26 for driving purposes. During forward pedaling and freewheeling the hub of FIG. 7 operates as described in connection with the embodiment of FIG. 1.

During backward pedaling, the threaded member 72 is moved to the left as illustrated in FIG. 7 so that the conical inner face 76 defined by the elastic blades 32 comes into engagement with the conical outer face 70, and the elastic blades are pressed against the braking face 42 of hub sleeve 26. Conical outer face 70 and conical inner face 76 are indented so that the reaction torque caused by braking is transmitted to the bearing ring 14.

We claim:
1. A freewheeling hub comprising, in combination:
 (a) an axle having an axis;
 (b) a driver member mounted on one axial portion of said axle for forward rotation and for backward rotation;
 (c) an annular bearing member fixedly mounted on another axial portion of said axle;
 (d) a sleeve member rotatably mounted on said driver member and on said bearing member and enclosing respective portions of said driver member and of said bearing member;
 (e) motion transmitting means operatively interposed between said driver member and said sleeve member for selectively transmitting rotary movement of said driver member to said sleeve member during forward rotation of said driver member;
 (f) an expandable brake shell mounted in said sleeve member, said shell including a plurality of axially elongated resilient blades normally spaced from said sleeve member and resiliently movable into frictional engagement therewith by expansion of said shell; and
 (g) brake actuating means responsive to backward rotation of said driver member for expanding said shell,
  (1) said actuating means including an actuating member operatively connected to said driver member for translational movement in said sleeve member relative to said bearing member in response to said backward rotation of the driver member, said bearing member and said actuating member constituting a pair of members,
  (2) said brake shell being integral with one member of said pair, and said blades thereof longitudinally extending from said one member in a common direction toward said other member,
  (3) said blades jointly defining a substantially conical outer surface of said shell in the relaxed condition of said blades, said surface tapering in said common direction, and
  (4) said blades being engaged by the other member of said pair for expansion of said shell during said translational movement.

2. A freewheeling hub comprising, in combination:
 (a) an axle having an axis;
 (b) a driver member mounted on one axial portion of said axle for forward rotation and for backward rotation;
 (c) an annular bearing member fixedly mounted on another axial portion of said axle;
 (d) a sleeve member rotatably mounted on said driver member and on said bearing member and enclosing respective portions of said driver member and of said bearing member;
 (e) motion transmitting means operatively interposed between said driver member and said sleeve member for selectively transmitting rotary movement of said driver member to said sleeve member during forward rotation of said driver member;
 (f) an expandable brake shell mounted in said sleeve member and integral with said bearing member, said shell including a plurality of resilient blades axially elongated in a common direction from said bearing member toward said actuating member, said blades being normally spaced from said sleeve member and resiliently movable into frictional engagement therewith by expansion of said shell; and
 (g) brake actuating means responsive to backward rotation of said driver member for expanding said shell,
  (1) said actuating means including a roller clutch mounted on said driver member and including a roller member operatively connected to said driver member and responsive to said backward rotation of the driver member to move radially outward into engagement with one of said blades for expansion of said shell.

3. A freewheeling hub comprising, in combination:
 (a) an axle having an axis;
 (b) a driver member mounted on one axial portion of said axle for forward rotation and for backward rotation;
 (c) an annular bearing member fixedly mounted on another axial portion of said axle;
 (d) a sleeve member rotatably mounted on said driver member and on said bearing member and enclosing respective portions of said driver member and of said bearing member;
 (e) motion transmitting means operatively interposed between said driver member and said sleeve member for selectively transmitting rotary movement of said driver member to said sleeve member during forward rotation of said driver member;
 (f) an expandable brake shell mounted in said sleeve member, said shell including a plurality of axially elongated resilient blades normally spaced from said sleeve member and resiliently movable into frictional engagement therewith by expansion of said shell; and
 (g) brake actuating means responsive to backward rotation of said driver member for expanding said shell,
  (1) said actuating means including an actuating member integral with said blades and mounted on said driver member for threaded movement about said axis, said blades longitudinally extending from said actuating member in a common direction toward said bearing member,
  (2) said brake actuating means further including yieldable means impeding rotary movement of said actuating member about said axis, said bearing member having a conical face about said axis and engageable with said blades for expansion of said shell when said actuating member moves axially relative to said drive member toward said bearing member.

4. A freewheeling hub comprising, in combination:
 (a) an axle having an axis;

(b) a driver member mounted on one axial portion of said axle for forward rotation and for backward rotation;

(c) an annular bearing member fixedly mounted on another axial portion of said axle;

(d) a sleeve member rotatably mounted on said driver member and on said bearing member and enclosing respective portions of said driver member and of said bearing member;

(e) motion transmitting means operatively interposed between said driver member and said sleeve member for selectively transmitting rotary movement of said driver member to said sleeve member during forward rotation of said driver member;

(f) an expandable brake shell mounted in said sleeve member, said shell including a plurality of axially elongated resilient blades normally spaced from said sleeve member and resiliently movable into frictional engagement therewith by expansion of said shell; and (g) brake actuating means responsive to backward rotation of said driver member for expanding said shell, (1) said actuating means including an actuating member operatively connected to said driver member for translational movement in said sleeve member relative to said bearing member in response to said backward rotation of the driver member, said bearing member and said actuating member constituting a pair of members, and (2) said brake shell being integral with one member of said pair and said blades thereof being engaged by the other member for expansion of said shell during said translational movement, (3) said bearing member and said sleeve member having respective axially coextensive portions having respective faces closely adjacent in a radial direction, one of said faces being formed with an annular recess, the other face carrying an annular rib engaging said recess and constituting therewith a labyrinth seal.

5. A hub as set forth in claim 4, wherein said blades longitudinally extend from said one member of said pair in a common direction toward said other member.

6. A hub as set forth in claim 3, wherein said blades have respective free end portions remote from said actuating member, respective faces of said end portions jointly defining a conically shaped face about said surface matingly engageable with said conical face of said bearing member by said axial movement of said actuating member, at least one of said conical faces being indented.

7. A hub as set forth in claim 1, wherein said motion transmitting means include a motion transmitting member mounted on said driver member for threaded movement about said axis, and yieldable means for impeding rotary movement of said motion transmitting member, said motion transmitting member and said sleeve member having respective faces conformingly engageable when said motion transmitting member axially moves on said driver member in response to said forward rotation.

8. A hub as set forth in claim 1, wherein each blade has a root adjacent said one member and a free end portion remote from said one member, said roots being spaced from each other and defining therebetween rounded apertures in said shell, said apertures tapering toward said free ends and constituting slots between said free ends narrower than the spacing of said roots.

9. A hub as set forth in claim 1, wherein said blades are integral with said bearing member.

10. A hub as set forth in claim 9, wherein said actuating member is mounted on said driver member for threaded movement about said axis, said brake actuating means further including yieldable means impeding rotary movement of said actuating member about said axis, said actuating member having a substantially conical face about said axis being engageable with said blades when said actuating member moves axially relative to said driver member.

References Cited by the Examiner

UNITED STATES PATENTS

| 773,333 | 10/1904 | Morrow | 192—6 |
| 2,587,864 | 3/1952 | Lefere | 29—159.3 |
| 2,917,816 | 12/1959 | Samson | 29—159.3 |
| 3,070,199 | 12/1962 | Hood | 192—6 |
| 3,110,379 | 11/1963 | Baker | 192—6 |

FOREIGN PATENTS

| 122,717 | 5/1931 | Austria. |
| 189,883 | 10/1907 | Germany. |

DAVID J. WILLIAMOWSKY, *Primary Examiner.*